US 8,424,829 B2

(12) United States Patent
Lu et al.

(10) Patent No.: US 8,424,829 B2
(45) Date of Patent: Apr. 23, 2013

(54) HOLDER FOR PORTABLE ELECTRONIC DEVICE

(75) Inventors: Li-Houng Lu, New Taipei (TW);
Hsin-Yung Yang, New Taipei (TW);
Ching-Min Lin, New Taipei (TW);
Tzu-Cheng Yu, Santa Clara, CA (US)

(73) Assignee: Chi Mei Communication Systems, Inc., New Taipei (TW)

( * ) Notice: Subject to any disclaimer, the term of this patent is extended or adjusted under 35 U.S.C. 154(b) by 0 days.

(21) Appl. No.: 13/459,525

(22) Filed: Apr. 30, 2012

(65) Prior Publication Data
US 2012/0211631 A1  Aug. 23, 2012

Related U.S. Application Data

(63) Continuation of application No. 13/036,116, filed on Feb. 28, 2011.

(51) Int. Cl.
*A47G 29/00* (2006.01)

(52) U.S. Cl.
USPC ............ 248/371; 248/152; 248/174; 248/459

(58) Field of Classification Search ................ 248/371, 248/447, 450, 453, 459, 460, 461, 174, 152; 206/45.24, 320; 40/530
See application file for complete search history.

(56) References Cited

U.S. PATENT DOCUMENTS

| | | | | |
|---|---|---|---|---|
| 1,897,305 A | * | 2/1933 | Doherty | 248/459 |
| 2,726,835 A | * | 12/1955 | Hummel | 248/459 |
| 3,097,444 A | * | 7/1963 | Steiner | 248/454 |
| 4,318,527 A | * | 3/1982 | Smith | 248/459 |
| 4,674,724 A | * | 6/1987 | Gaudet | 248/459 |
| 5,377,794 A | * | 1/1995 | Book | 190/1 |
| 5,607,054 A | | 3/1997 | Hollingsworth | |
| 6,763,942 B1 | | 7/2004 | Yeh | |
| 6,825,415 B1 | | 11/2004 | Chen et al. | |
| 6,829,140 B2 | | 12/2004 | Shimano et al. | |
| 7,191,926 B1 | | 3/2007 | Costantino et al. | |
| 7,251,127 B2 | | 7/2007 | Ghosh et al. | |
| 7,545,634 B2 | | 6/2009 | Simonian et al. | |
| 7,561,415 B2 | | 7/2009 | Liou et al. | |
| 7,861,995 B2 | | 1/2011 | Liou | |
| 8,089,760 B2 | | 1/2012 | Yi-Chang | |
| 2006/0285283 A1 | | 12/2006 | Simonian et al. | |
| 2008/0237432 A1 | | 10/2008 | Patterson | |
| 2010/0122924 A1 | | 5/2010 | Andrews | |
| 2010/0300909 A1 | | 12/2010 | Hung | |

(Continued)

FOREIGN PATENT DOCUMENTS

WO  2010/036090 A2  4/2010

OTHER PUBLICATIONS

Squirrel, "Origami IPAD Sleeve From Incase," Gaygadget (Nov. 4, 2010).

(Continued)

*Primary Examiner* — Anita M King
(74) *Attorney, Agent, or Firm* — Altis Law Group, Inc.

(57) ABSTRACT

A holder is for supporting a portable electronic device, including a foldable layer, a supporting assembly attached to the layer. When the holder is unfolded, the supporting assembly can be maintained in a two-dimensional structure. When the holder is folded, the supporting assembly forms a three-dimensional structure that will not collapse under a weight of the portable electronic device.

22 Claims, 7 Drawing Sheets

U.S. PATENT DOCUMENTS

| | | |
|---|---|---|
| 2011/0134590 A1 | 6/2011 | Clark et al. |
| 2011/0180682 A1 | 7/2011 | Tarnutzer et al. |
| 2011/0203955 A1 | 8/2011 | Fasula |
| 2011/0259788 A1 | 10/2011 | Zeliff et al. |
| 2011/0284420 A1 | 11/2011 | Sajid |
| 2011/0285258 A1 | 11/2011 | Yuan |
| 2011/0286171 A1 | 11/2011 | Franz et al. |
| 2011/0297564 A1 | 12/2011 | Kim et al. |
| 2011/0297566 A1 | 12/2011 | Gallagher et al. |

OTHER PUBLICATIONS

Incase, "Introducing the Convertibel Magzine Jacket for ipad", Incase website (Nov. 23, 2010).

* cited by examiner

US 8,424,829 B2

HOLDER FOR PORTABLE ELECTRONIC DEVICE

CROSS-REFERENCE TO RELATED APPLICATIONS

This application is a continuation application of U.S. Ser. No. 13/036,116, filed Feb. 28, 2011, the contents of which are hereby incorporated by reference. The patent application Ser. No. 13/036,116 in turn claims the benefit of priority under 35 USC 119 from Taiwan Patent Application 099143489, filed on Dec. 13, 2010.

This application is also related to co-pending U.S. Patent Applications as the following listed. Such applications have the same assignee as the present application, and are incorporated herein by reference.

| Ser. No. | Title | Inventors |
| --- | --- | --- |
| 29/386,290 | MULTIFUNCTIONAL CASE FOR PORTABLE ELECTRONIC DEVICE | Lu et al. |
| 13/082,546 | MULTIFUNCTIONAL CASE FOR PORTABLE ELECTRONIC DEVICE | Yang et al. |
| 29/408,942 | PROTECTING CASE FOR PORTABLE ELECTRONIC DEVICE | Yang et al. |
| N/A | HOLDER FOR PORTABLE ELECTRONIC DEVICE | Yang et al. |

TECHNICAL FIELD

This disclosure relates to cases for portable electronic devices, particularly, to a multifunction case for protecting and supporting portable electronic devices.

On one hand, cases are widely applied to protect portable electronic devices. On another hand, users generally need a holder for supporting the portable electronic device to for example read an eBook or watch video. However, it can be difficult to carry the case and the holder at the same time. In many cases, the holder can be easily left behind after use.

Therefore, there is room for improvement within the art.

BRIEF DESCRIPTION OF THE DRAWINGS

Many aspects of the holder can be better understood with reference to the following drawings. The components in the drawings are not necessarily drawn to scale, the emphasis instead being placed upon clearly illustrating the principles of the holder.

DETAILED DESCRIPTION

Figure 1:
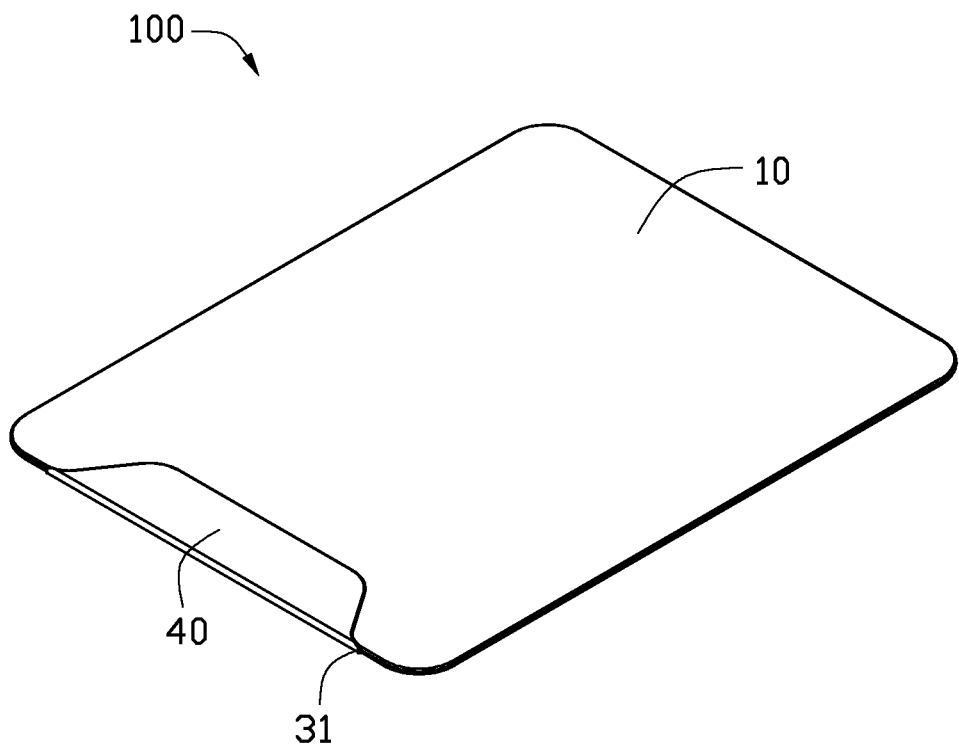
FIG. 1 is an isometric view of a holder, in accordance with an exemplary embodiment.
Figure 5:
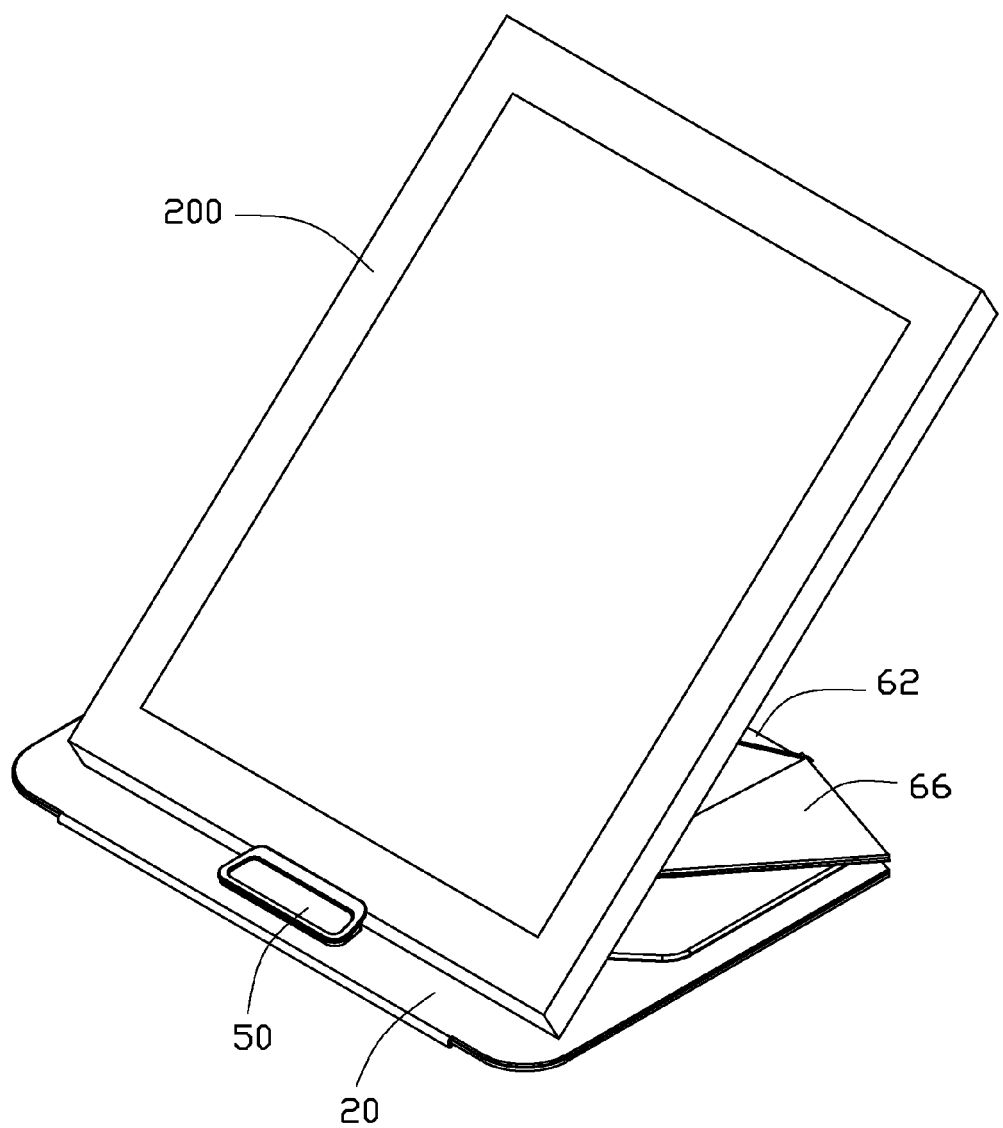
FIG. 5 is similar to FIG. 4, showing a portable electronic device supported by the holder.

FIGS. 1 and 5 show an exemplary embodiment of a holder 100. The holder 100 can receive and protect a portable electronic device 200, and can also support and hold the portable electronic device 200.

Figure 2:
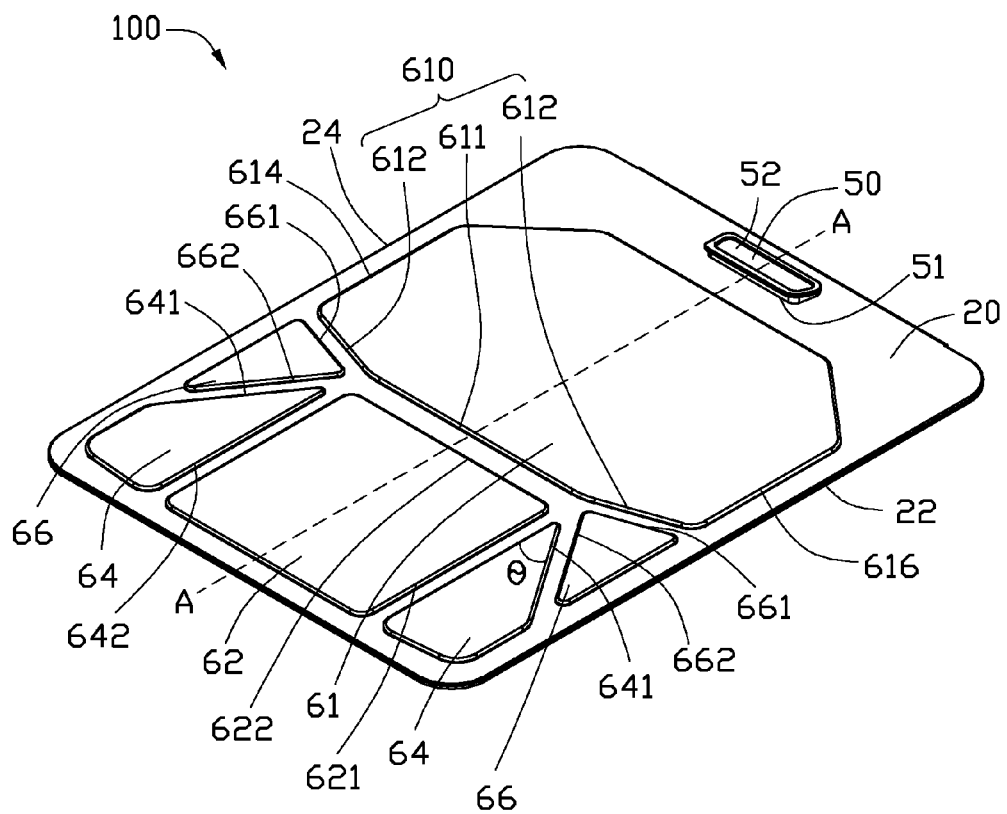
FIG. 2 is similar to FIG. 1, but shown from another aspect.

Also referring to FIG. 2, the case 100 includes a first layer 20, a second layer 10, and a covering piece 40. A receiving space (not labeled) is defined between the second layer 10 and the first layer 20 for receiving the portable electronic device 200. The second layer 10 and the first layer 20 are connected to each other along their edges, leaving a hole 31 that allows the portable electronic device 200 to be inserted into the receiving space. The first and second layers 20 are made of soft material, e.g., fiber, cotton, vinyl, thermoplastics.

The covering piece 40 is flexible and is used to cover the hole 31. The covering piece 40 may extend from the first layer 20 to adjacent to and covering the hole 31.

A locking member 50, a base portion 61, a main supporting portion 62, two side supporting portions 64 and two retaining portions 66 are formed on the first layer 20. The locking member 50 is positioned on the first layer 20 and adjacent to the hole 31. The locking member 50 includes a head 52, and a slot 51 formed between the first layer 20 and the head 52 for supporting an end of the portable electronic device 200 therein. The first layer 20 includes a first edge 22 and an opposite second edge 24 parallel with and opposite to the first edge 22. The base portion 61 includes first and second opposite base edges 614, 616 adjacent to and parallel with the first and second edges 22, 24 of the first layer 20. Each side supporting portion 64 is located between the main supporting portion 62 and an edge 22 or 24 of the first layer 20. Each retaining portion 66 is located between the main supporting portion 62 and an edge 22 or 24 of the first layer 20. When the holder 100 folded, the base portion 61, the main supporting portion 62, the side supporting portions 64, and the retaining portions 66 cooperatively create a three-dimensional structure that can support the portable electronic device 200 at an angle relative to the first layer 20 (see FIG. 5).

A supporting assembly includes the portions 61, 62, 64, 66. Though the portions 61, 62, 64, 66 can be folded relative to each other, the portions 61, 62, 64, 66 are themselves rigid and cannot be folded themselves. The supporting assembly is two-dimensional when the holder 100 is unfolded and made flat, and when folded the supporting assembly can form a three-dimensional structure that will not collapse under a weight, such as that of the electronic device 200. When forming the three-dimensional structure, the fold angles between the base portion 61, main supporting portion 62, side supporting portions 64, and retaining portions 66 cooperate to prevent the three-dimensional structure from collapsing under a weight, such as that of the electronic device 200. Meanwhile, an exposing opening 63 (see FIG. 4) is defined by the base portion 61, main supporting portion 62, side supporting portions 64. The portions 61, 62, 64, 66 cover most of the outer surface of the first layer 20 and are separate from each other.

The portions 61, 62, 64, 66 are symmetrically positioned relative to a longitudinal center line A-A of the first layer 20. The base portion 61 is positioned adjacent to the locking member 50 and includes a baseline 610 at one edge thereof. The baseline 610 includes a middle portion 611 and two end portions 612. The two end portions 612 are angled toward the locking member 50. The main supporting portion 62 is rectangular having two side edges 621 and two end edges 622. The edges 622 are parallel to the middle portion 611 of the baseline 610.

The two side supporting portions 64 are respectively positioned at two sides of the main supporting portion 62. Each side supporting portion 64 includes a sloping edge 641 and a bottom edge 642. The sloping edge 641 is obliquely angled with respect to the bottom edge 642. An angle θ between the sloping edge 641 and the bottom edge is about 30 degrees to about 60 degrees. The bottom edge 642 is adjacent to and parallel to one of the side edges 621 of the main supporting portion 62.

The retaining portion 66 is positioned between the base portion 61 and the corresponding side supporting portion 64. Each retaining portion 66 includes a first edge 661 and a second edge 662. The first edge 661 is adjacent to and parallel to the corresponding end portion 612 of the base portion 61. The second edge 662 is adjacent to and parallel to the sloping edge 641 of the corresponding side supporting portion 64.

Figure 3:
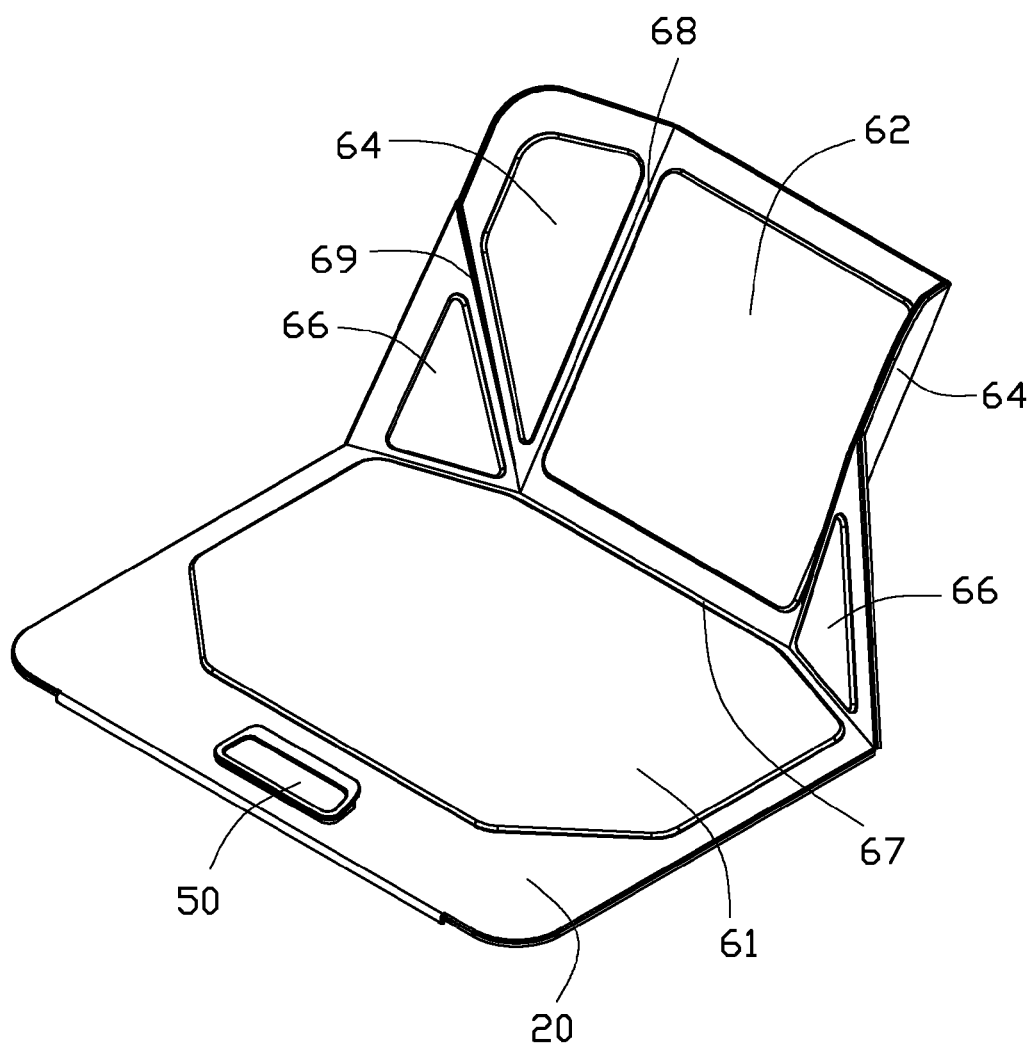
FIG. 3 is similar to FIG. 2, showing the holder in a state of being folded.

Referring to FIG. 3, the space between the retaining portions 66 and the base portion 61 and the space between the main supporting portion 62 and the base portion 61 together form a first folding area 67. A space between the side supporting portion 64 and the main supporting portion 62 forms a second folding area 68. A space between the side supporting portion 64 and the retaining portion 66 forms a third folding area 69.

Figure 4:
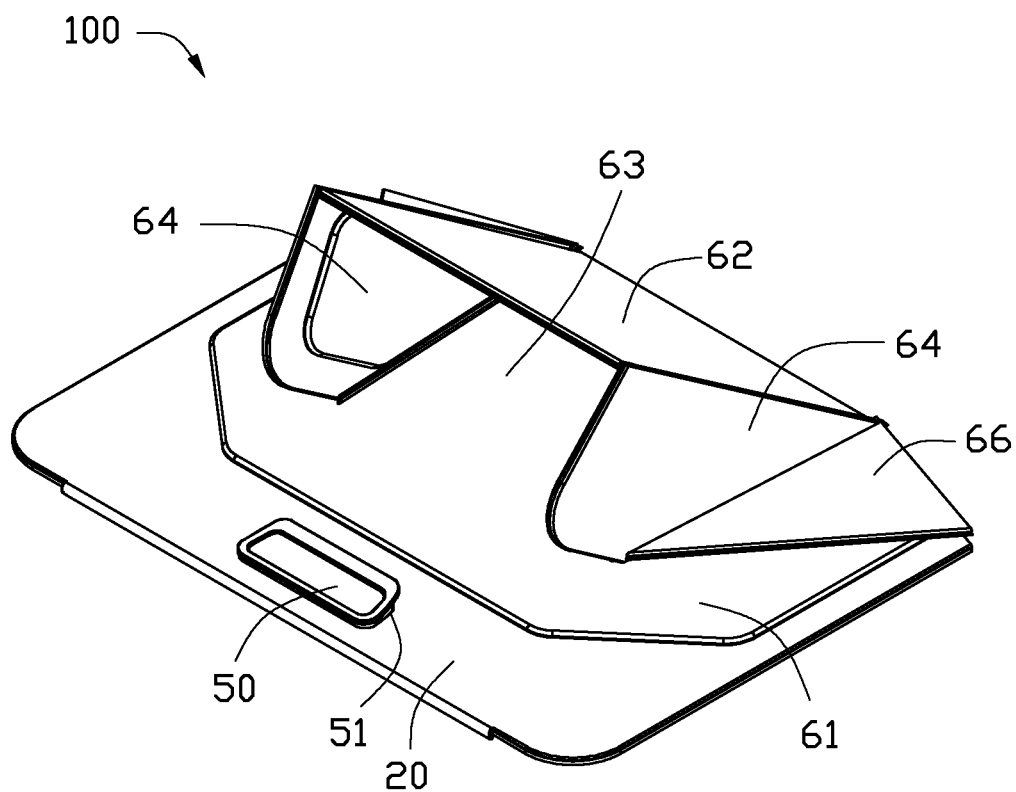
FIG. 4 is similar to FIG. 3, showing the holder folded as a support.

Also referring to FIG. 4, to fold the case 100 to form a support, the retaining portions 66 and the main supporting portion 62 are folded toward the base portion 61 along the first folding area 67. The two retaining portions 66 are positioned on the base portion 61, bringing the side supporting portions 64 to rotate relative to the second and third folding areas 69 at the same time. The side supporting portions 64 are perpendicular to the base portion 61 and the main supporting portion 62. The main supporting portion 62 is at an angle θ with the base portion 61. The retaining portions 66 are non-perpendicularly supported by the base portion 61. Each retaining portion 66 directly and entirely contacts and covers the base portion 61.

Referring to FIG. 5, the portable electronic device 200 is set on the case 100 as a support. The holder 100 is folded, and the main supporting portion 621 contacts a support surface, the relative angles of the side supporting portions 64 and the retaining portions 66 support the main supporting portion 62 at an angle relative to the support surface. One end of the portable electronic device 200 is supported in the slot 51 of the locking member 50. The portable electronic device 200 is supported by the main supporting portions 62 and the side supporting portions 64 at an angle. Thus, users can comfortably view the display of the portable electronic device 200.

Figure 6:
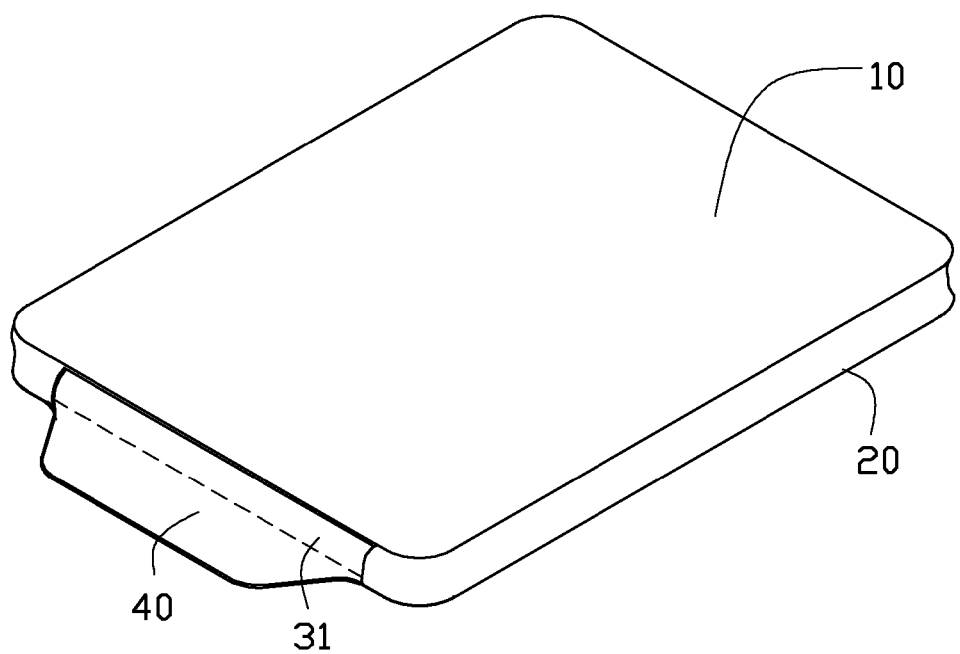
FIG. 6 is similar to FIG. 1, showing the holder receiving a portable electronic device therein.

Referring to FIG. 6, after viewing the display of the device 200, the covering piece 40 is folded over to uncover the hole 31. The device 200 can then be inserted into the receiving space of the case 100 via the hole 31 for storage.

Figure 7:
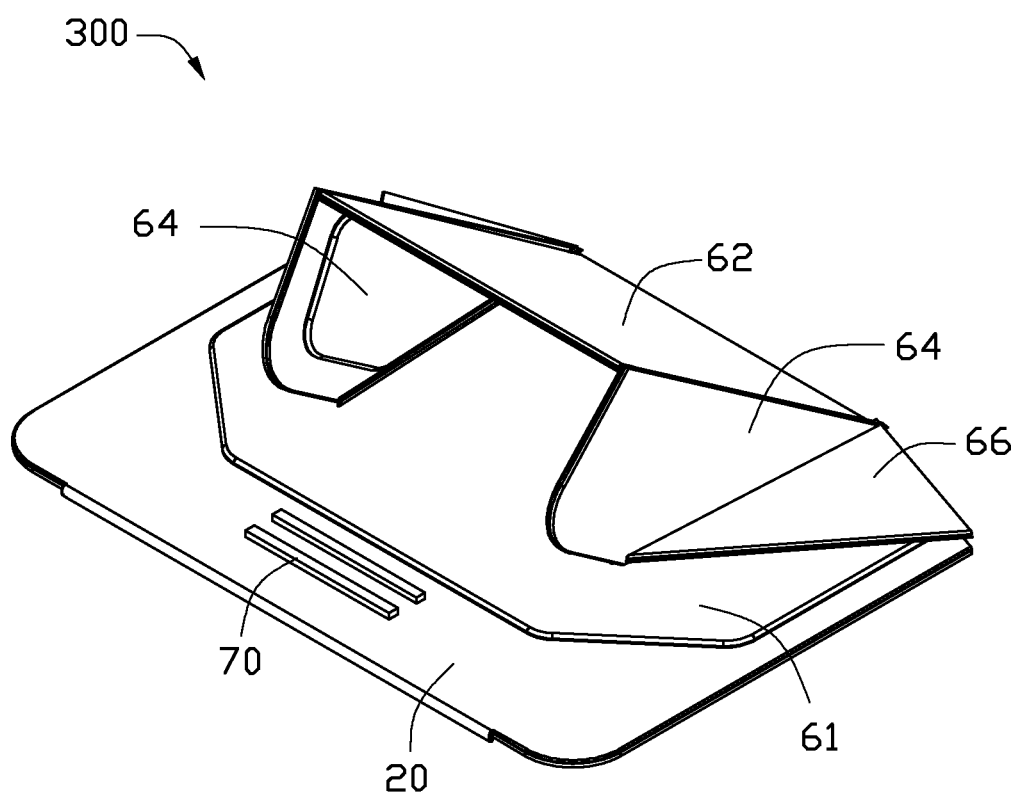
FIG. 7 is an isometric view of another holder, in accordance with another exemplary embodiment.

FIG. 7 shows another exemplary embodiment of a holder 100. The structure of the case 300 is similar to case 100 except that a plurality of parallel bars 70 protruding from the first layer 20 replace the locking member 50. The bars 70 are spaced from each other. Thus, users can select one of the bars 70 to support the end of the device 200 to one of various angles for viewing the display.

It is to be understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A foldable holder for holding and supporting a portable electronic device, comprising:
   a first layer having first and second opposite edges;
   a base portion having first and second opposite base edges adjacent to and parallel with the first and second edges of the first layer;
   a main supporting portion;
   two side supporting portions, each side supporting portion located between the main supporting portion and one of the first edge and the second edge of the first layer; and
   two retaining portions, each retaining portions located between the main supporting portion and one of the first edge and the second edge of the first layer;
   wherein, when the holder is folded, the base portion, the main supporting portion, the side supporting portions, and the retaining portions cooperatively form a three-dimensional structure that can support the portable electronic device at an angle relative to the first layer without collapsing.

2. The foldable holder as claimed in claim 1, wherein when folded, the main supporting portion is angled with the base portion, the retaining portions are non-perpendicularly supported by the base portion, and each of the side supporting portions is angled with the retaining portions and the main supporting portion.

3. The foldable holder as claimed in claim 1, wherein a first folding area is formed between the base portion and the main supporting portion, the retaining portion, a second folding area is formed between each side supporting portion and the main supporting portion, and a third folding area is formed between each pair of the side supporting portion and the retaining portion.

4. The foldable holder as claimed in claim 3, wherein the base portion includes a baseline, the baseline includes a middle portion and two end portions, and the main supporting portion includes an end edge adjacent to and parallel with the middle portion.

5. The foldable holder as claimed in claim 4, wherein the retaining portion includes a first edge adjacent to and parallel with the end portion of the baseline the retaining portion further includes a second edge, and the side supporting portion includes a sloping edge adjacent to and parallel with the second edge.

6. The foldable holder as claimed in claim 4, wherein the side supporting portion further includes a bottom edge, and the main supporting portion further includes a side edge adjacent to and parallel with the bottom edge.

7. The foldable holder as claimed in claim 1, further comprising a locking member adjacent to the base portion, the locking member cooperates with the main supporting portion and the side supporting portions to hold the portable electronic device.

8. The foldable holder as claimed in claim 7, wherein the locking member includes a head, and a slot is formed between the head and the second layer, the slot for supporting an end of the portable electronic device therein.

9. The foldable holder as claimed in claim 7, wherein the locking member includes a plurality of parallel bars protruding from the second layer.

10. The foldable holder as claimed in claim 1, wherein the main supporting portion, the side supporting portions and the base portion define an opening, the opening facing the portable electronic device.

11. The foldable holder as claimed in claim 1, further comprising a second layer connected to the first layer, a receiving space is formed between the first layer and the second layer for receiving the portable electronic device, a hole is formed to communicate with the receiving space, the hole allowing the portable electronic device to be inserted into the receiving space.

12. The foldable holder as claimed in claim 11, further comprising a flexible covering piece to cover the hole.

13. The foldable holder as claimed in claim 1, further comprising a second layer connected to the first layer; the base portion, the main supporting portion, the two side supporting portions, and the two retaining portions formed on the first layer.

14. The foldable holder as claimed in claim 13, wherein the first layer and the second layer are made from one or more materials selected from a group consisting of fiber, cotton, vinyl, thermoplastics.

15. A foldable holder for holding and supporting a portable electronic device, comprising:
   a base portion;
   a main supporting portion adjacent to the base portion;
   two side supporting portions, each side supporting portion positioned at a side of the main supporting portion;
   two retaining portions, each retaining portion positioned at a side of the main supporting portion;
   wherein, when the holder is unfolded, the base portion, the side supporting portions, the main supporting portion, the retaining portions are positioned substantially coplanar with each other;
   when the holder is folded, the main supporting portion contacts a support surface, the relative angles of the side supporting portions and the retaining portions support the main supporting portion at an angle relative to the support surface;
   wherein the main supporting portion, the side supporting portions and the base portion define an opening, the opening facing the portable electronic device.

16. The foldable holder as claimed in claim 15, wherein a first folding area is formed between the base portion and the main supporting portion, the retaining portion, a second folding area is formed between each side supporting portion and the main supporting portion, and a third folding area is formed between each pair of the side supporting portion and the retaining portion.

17. The foldable holder as claimed in claim 15, further comprising a first layer and a second layer connected to the first layer, a receiving space is formed between the first layer and the second layer for receiving the portable electronic device, a hole is formed to communicate with the receiving space, the hole allowing the portable electronic device to be inserted into the receiving space.

18. The foldable holder as claimed in claim 15, further comprising a first layer and a second layer connected to the first layer, the base portion, the main supporting portion, the two side supporting portions, and the two retaining portions are formed on the first layer.

19. The holder as claimed in claim 15, wherein the holder is folded to move the side supporting portions, the main supporting portion, the retaining portions towards the base portion, during folding, the side supporting portions, the main supporting portion, the retaining portions cannot be folded themselves.

20. A foldable holder, for holding and supporting a portable electronic device, comprising:
   a foldable layer comprising opposite edges;
   a supporting assembly attached to the foldable layer, the supporting assembly comprising a base portion, a main supporting portion, and two opposite side supporting portions, each side supporting portion located between the main supporting portion and one of the edges of the foldable layer, the area adjacent to the combination of the main supporting portion and the two side supporting portions forming a first folding area of the layer, the area between each side supporting portion and the main supporting portion forming a second folding area of the layer;
   wherein,
   when the holder is unfolded, the supporting assembly forms a two-dimensional structure;
   when the holder is folded, the base portion, the main supporting portion, and the side supporting portions form a three-dimensional structure that will not collapse under a weight of the portable electronic device.

21. The foldable holder as claimed in claim 20, wherein the supporting assembly further comprises two retaining portions formed between the side supporting portions and the base portion, the area between the each side supporting portion and the corresponding one retaining portion form a third folding area of the bottom wall.

22. The foldable holder as claimed in claim 21, wherein each retaining portions located between the main supporting portion and one of the edges of the foldable layer.

* * * * *